July 14, 1964      M. B. SHARENOW      3,140,969
GEL-ADHERED STREAMLINED BALLOON AND METHOD OF MANUFACTURE
Filed June 3, 1960
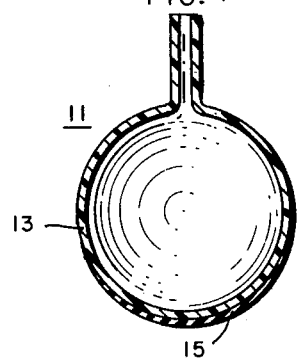
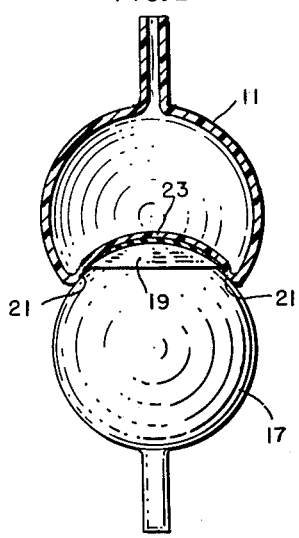
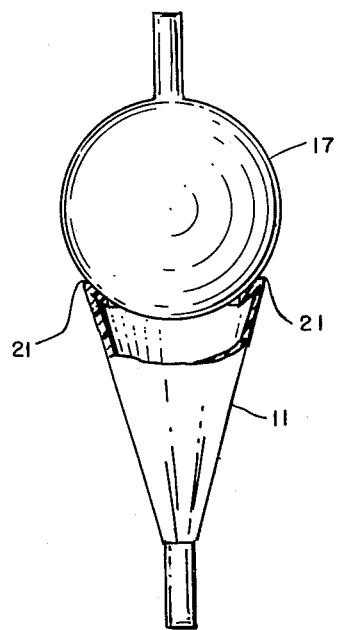
*INVENTOR,*
MOSES B. SHARENOW
BY *Harry M. Saragovitz*
ATTORNEY.

United States Patent Office 3,140,969
Patented July 14, 1964

3,140,969
GEL-ADHERED STREAMLINED BALLOON AND
METHOD OF MANUFACTURE
Moses B. Sharenow, Wanamassa, Asbury Park, N.J.,
assignor to the United States of America as represented by the Secretary of the Army
Filed June 3, 1960, Ser. No. 33,867
2 Claims. (Cl. 156—268)
(Granted under Title 35, U.S. Code (1952), sec. 266)

The invention described herein may be manufactured and used by or for the Government for governmental purposes without the payment of any royalty thereon.

The present invention relates to the manufacture of fast-rising streamlined meteorological balloons of extensible material and the newly improved balloon made by such improved technique.

In the manufacture of meteorological balloons a prime objective sought by manufacturers of such balloons is to effectively reduce the weight of such balloons to thereby reduce the inflation volume.

Fast rising balloons have been used by the armed services to report weather conditions aloft in the field and elsewhere. Such balloons have been spherical in shape and require a hydrogen volume of more than 300 cubic feet. The spherical shape of earlier balloons leads to a considerable high drag coefficient due to the air turbulence and consequent partial vacuum built up in the area just below the balloon as it ascends.

It has been proposed to overcome this difficulty by employing a streamlined balloon whereby the drag coefficient would be reduced and a smaller volume of gas would be required to inflate the balloon. A single body streamlined balloon has not been completely satisfactory in that the center of buoyancy is so low as to cause instability as the balloon ascends, thereby increasing the effective drag coefficient. It has therefore been proposed that a spherical balloon be provided with a tapered uninflated or slightly inflated tail. A balloon of such structure produced good stability in that the center of buoyancy of the entire structure would be high. Various techniques and methods of fabrication have been suggested for making meteorological balloons. One method has been proposed in U.S. Patent 2,790,479 to Mastenbrook wherein two preformed balloons are coated on part of their surface with adhesive and adhered together. A small circular area within the adhered band is cut away from the lower balloon which thus forms a skirt for the upper balloon. Another method of fabricating balloons of the same general type is described in U.S. Patent 2,929,110 to Nickerson et al. wherein there is described a method of producing gel-adhered streamlined balloons which comprises essentially the steps of forming identical wet gel structures having a partial coating of natural rubber on each, drying the ballons until only the natural rubber gel coat remains tacky and pressing the natural rubber gel surface against each other to produce a joint composite therebetween and curing the joined structures. It is thus apparent, by the method described in the Nickerson et al. patent, there is produced a streamlined balloon in which the joint composite junction is formed of two thicknesses of rubber or like material. Such joint composite junction obviously adds to the overall weight of the balloon.

An object of this invention is to overcome the above shortcomings of the prior art techniques. The process herein described produces a streamlined balloon prepared generally as the prior art, specifically to the gel-adhered type of balloon but, however, providing an added step that substantially reduces the weight of the balloon by several hundred grams and thereby reduces the inflation volume.

The above and other objectives are accomplished by preparing gel-adhered balloons of the type shown in the prior art and, prior to joining the two balloons, masking out about one-third of one of the balloons while in the wet gel state by the use of a suitable masking cap to prevent adherence of all of the balloon to its adjacent balloon except for a narrow adhering zone. The unadhered masked part is cut away after curing thereby effectively reducing the overall weight of the resultant streamlined balloon.

The invention can best be understood from the following description to be read in view of the accompanying drawing in which:

FIG. 1 is a sectional view of one of the two similar balloons that form to make the completed streamlined array assembly;

FIG. 2 shows the pair of balloons partly in section, and partly in elevation, during one stage of assembly; and FIG. 3 is a view, also in section and elevation, showing the completed streamlined balloon assembly.

In FIG. 1 there is shown one completed spherical balloon designated as 11 and includes the balloon body 13, usually made of neoprene, and provided with an overlay of rubber at its lower end such as shown at 15. The manner in which the balloon 11 is made or fabricated forms no part of this invention. Furthermore, the specific materials from which the balloon is made is not critical. The specific combination of neoprene and rubber have been chosen as exemplary because of specific advantages possessed by each. Another balloon 17, identical to balloon 11, is utilized in making the streamlined assembly as shown in FIG. 3, and the manner in which the two balloons are joined is shown clearly in FIG. 2. Immediately prior to bringing the balloons 11 and 17 into abutment, a masking device, such as shown at 19, is confined between the two balloons. The mask 19 is placed between the balloons with the upper balloon 11 slightly deflated so that the lower balloon 17 can be urged into the upper balloon. While in FIG. 2, the mask 19 is not drawn in true scale to the relative size of the balloons shown, it is suggested that the mask 19 can be as large as to cover substantially one third of the spherical surface of the lower balloon 17 whereby when said balloon is urged into engagement with the upper balloon a substantial portion of said upper balloon will be masked but still permitting abutment of the peripheral edges of the balloons, i.e., circumferentially around the edges of the mask to be in abutment. The material from which the mask is made is critical to the invention in that it should be made of a material that will not adhere to the body portion 15 of the balloons when said material is in its tacky state as they are in such condition when brought together to form the streamlined balloon. It is, however, apparent from an inspection of FIG. 2 that those gel portions of body at 15 which are not covered by the mask 19 will abut each other and adhere to each other. The continuous path of such engagement of the two balloons is shown at 21. After such adhesion between the gel bodies 15 of the discrete balloons, the joined gels are heat treated and cured for a suitable length of time to form a strong bond. After such heat curing the mask is removed and that portion of the unadhered portion 23 of the balloon 11 is cut away and discarded. The result of cutting away such unadhered gel portion is shown in FIG. 3 which shows the balloons 11 and 17 joined and bonded only at the points 21. Since the main central portion 23 of the balloon 11 has been cut away, the completed structure presents only a single layered balloon throughout mainly the adhered skirt and balloon portions, except for the relatively small bonded portion heretofore described.

While there has been herein described what is considered the preferred method of fabricating a streamlined balloon it is obvious that changes may be made without departing from the scope of the invention. Thus, for example, while the masking shield 19 is shown as a solid, it is obvious that any form of mask can be utilized. For example, a suitable material may be sprayed, or otherwise deposited on the prescribed area of one of the balloons. Also, whether such mask is substantially rigid or flexible is of no import to the invention. The only required characteristic of the mask is that it does not adhere to the tacky gel material of the balloon with which it is in abutment.

What is claimed is:

1. In the process of making a gel-adhered streamlined balloon including the steps of forming a first wet gel structure by applying a synthetic rubber gel to a mold, coating said gel covered mold with a partial coating of natural rubber gel, stripping the gels from said mold, inflating said wet gel structure to its gel inflated diameter and drying the same until only the natural rubber gel remains tacky and deflating said gel structure, the improvement comprising masking a portion of the natural rubber gel surface with a material that will not adhere to said tacky natural rubber gel, pressing the masked first gel structure against the tacky rubber gel surface of a second identically prepared gel structure whereby only the circumferential edges of the tacky natural rubber gel portions of said first and second structures will be joined, curing said joined edges, cutting away the unadhered tacky natural rubber gel portion from only one of said balloon structures and removing said mask.

2. In the process of making a gel-adhered streamlined balloon including the steps of forming a first wet gel structure by applying a wet coat of neoprene gel to a mold, coating said gel covered mold with a partial coating of natural rubber gel, stripping the gels from said mold, inflating said wet gel structure to its gel inflated diameter and drying the same until only the natural rubber gel remains tacky and deflating said gel structure, the improvement comprising inserting a substantially cup shaped mask of a material that will not adhere to said tacky natural rubber gel between said first gel structure and a second gel structure identically prepared as said first structure, pressing the natural rubber gel surface of said first gel structure against the natural gel rubber surface of said second structure whereby only the circumferential edges of the tacky natural rubber gel portions of each of said structures adjacent to the peripheral edge of said mask will be joined, curing said joined edges, cutting away the unadhered tacky natural rubber gel portion from only one of said balloon structures and removing said mask.

References Cited in the file of this patent

UNITED STATES PATENTS

| | | |
|---|---|---|
| 1,970,802 | Johnson | Aug. 21, 1934 |
| 2,241,385 | Beal | May 13, 1941 |
| 2,378,700 | Habib et al. | June 19, 1945 |
| 2,614,293 | Vaisala | Oct. 21, 1952 |
| 2,790,479 | Mastenbrook | Apr. 30, 1957 |
| 2,844,336 | Mastenbrook | July 22, 1958 |
| 2,858,090 | Winzen et al. | Oct. 28, 1958 |
| 2,929,110 | Nickerson et al. | Mar. 22, 1960 |